United States Patent
Gan et al.

(10) Patent No.: US 7,034,513 B2
(45) Date of Patent: Apr. 25, 2006

(54) POWER SUPPLY HAVING EFFICIENT LOW POWER STANDBY MODE

(75) Inventors: Hongjian Gan, Taipei (TW); Qinggang Kong, Taipei (TW); Alpha J. Zhang, Taipei (TW); Jian Jung Chang, Taipei (TW)

(73) Assignee: Delta Electronics, Inc., (TW)

( * ) Notice: Subject to any disclaimer, the term of this patent is extended or adjusted under 35 U.S.C. 154(b) by 99 days.

(21) Appl. No.: 10/654,307

(22) Filed: Sep. 3, 2003

(65) Prior Publication Data

US 2005/0046399 A1    Mar. 3, 2005

(51) Int. Cl.
*G05F 1/40* (2006.01)
(52) U.S. Cl. .................. 323/285; 323/225; 323/315
(58) Field of Classification Search ............. 363/21.4, 363/21.1, 21.16, 19, 20, 21.18, 56, 97; 323/282, 323/299, 225, 285, 315, 288
See application file for complete search history.

(56) References Cited

U.S. PATENT DOCUMENTS

| | | | | |
|---|---|---|---|---|
| 5,773,966 | A * | 6/1998 | Steigerwald | 323/284 |
| 5,852,550 | A * | 12/1998 | Majid et al. | 363/21.05 |
| 5,959,851 | A * | 9/1999 | Shutts | 363/21.18 |
| 6,646,894 | B1 * | 11/2003 | Hong et al. | 363/21.01 |
| 6,724,174 | B1 * | 4/2004 | Esteves et al. | 323/224 |
| 6,828,766 | B1 * | 12/2004 | Corva et al. | 323/284 |

* cited by examiner

*Primary Examiner*—Rajnikant B. Patel
(74) *Attorney, Agent, or Firm*—Volpe and Koenig, P.C.

(57) ABSTRACT

A power supply has a normal operation mode and a standby operation mode. The power supply includes a main circuit, a first control circuit, a second control circuit, and a switching controller. The main circuit has at least one output port for converting an input voltage into an output voltage at the output port. The first control circuit is used for controlling the main circuit under the normal operation mode. The second control circuit is used for controlling the main circuit under the standby operation mode. And, the switching controller processes a control signal to control the first control circuit and the second control circuit under either of the normal operation mode and the standby operation mode in response to a load status of the output port.

15 Claims, 4 Drawing Sheets

POWER SUPPLY HAVING EFFICIENT LOW POWER STANDBY MODE

FIELD OF THE INVENTION

The present invention relates to a power supply and more particularly to a power supply having an efficient low power standby mode.

BACKGROUND OF THE INVENTION

Low standby loss is becoming a basic requirement for power supplies. Generally, there are two methods to achieve this requirement. One method is to reduce the operating frequency of a power converter, and the other one is to operate a power converter in a burst mode. When in the burst mode, the converter operates in several continuous switching cycles and then follows a no switching time period. With this means, the equivalent switching cycles in a certain time is low and thus the standby loss of the converter, mainly including the switching cycle related power loss, is low.

Please refer to FIG. 1. FIG. 1 is a block diagram of a conventional power converter having a normal operation mode and a standby mode according to the prior art. The power converter circuit includes a main circuit 10, a main control circuit 12, and a standby controller 14a. The main control circuit 12 includes a normal operation controller 12a and an error amplifier 12b. Accepting the output voltage of the power converter as its input, the error amplifier 12b outputs an error-amplified voltage $V_{E/A}$.

In the normal operation mode, the normal operation controller 12a provides a driving signal $S_{normal}$ to the main circuit 10. And in the standby operation mode, the standby controller 14a provides a driving signal $S_{standby}$ to the main circuit 10.

As for a PWM converter with diode rectifier at its output side, the error-amplified feedback voltage $V_{E/A}$ in the standby operation mode is very different from that in the normal operation mode. Meanwhile, $V_{E/A}$ changes obviously with load in the standby operation mode. So $V_{E/A}$ can be utilized to identify the loading condition of a PWM converter, and can be applied to the light load conditions for selecting the standby controller and for achieving the low standby loss of a power supply.

But in some kinds of converters and even in case of the PWM converter with synchronous rectifier, $V_{E/A}$ changes little with the load and it becomes an impractical approach to running the converter in the burst mode under light load conditions by sensing the $V_{E/A}$ signal.

Because of the technical defects described above, the applicant keeps on carving unflaggingly to develop a general approach to achieve a power supply having efficient low power standby mode through wholehearted experience and research.

SUMMARY OF THE INVENTION

The present invention provides a general control approach to realize low standby loss for power converters.

In the converter of the invention, only one of the normal operation controller and the standby controller is selected to control the main circuit in one time. Wherein, a loading hysteretic comparator, by sensing the load status, selects one controller to control the converter. When the load decreases to a low threshold of the loading hysteretic comparator, the loading hysteretic comparator generates a signal and then this signal disables the normal operation controller while enables the standby controller. When the load increases to a high threshold of the loading hysteretic comparator, the loading hysteretic comparator generates a signal, and then this signal enables the normal operation controller while disables the standby controller. Because the output current directly reflects the load status, it is generally sensed as the input signal of the loading hysteretic comparator.

With this means, moreover, in standby operation mode, a voltage hysteretic comparator functions as delta control of the output voltage. When the output voltage decreases to a low threshold of the voltage hysteretic comparator, the main circuit of the power converter operates and the output voltage increases. When the output voltage increases to a high threshold of the voltage hysteretic comparator, the main circuit of the power converter stops switching and the output voltage decreases. Therefore, in the standby operation mode, the power converter operates in the burst mode which results in a low standby loss.

With the above and the additional objects and advantages in mind as will hereinafter appear, the invention will be described with reference to the accompanying drawing, in which:

DETAILED DESCRIPTION OF THE INVENTION

Figure 1:
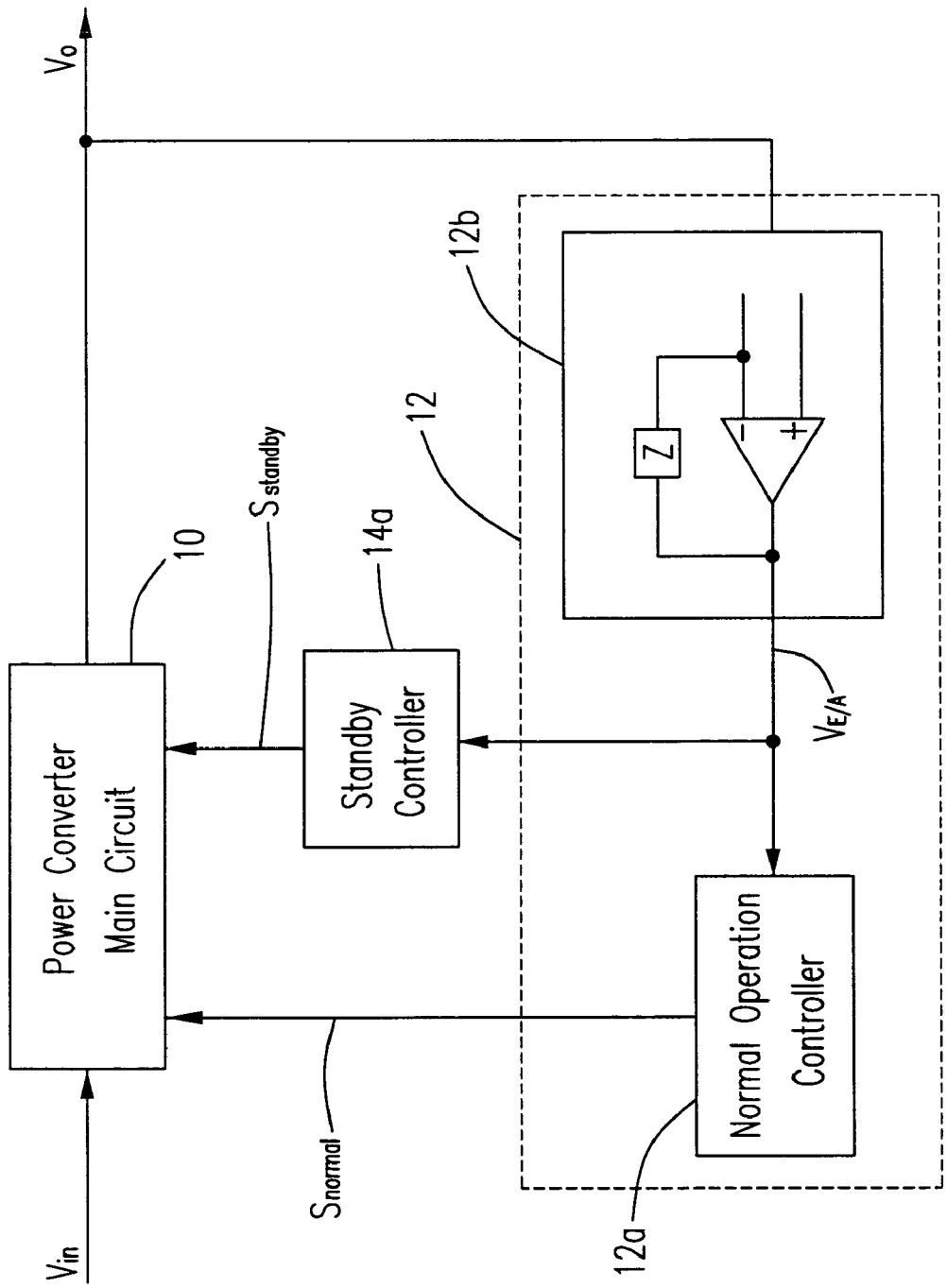
FIG. 1 is a block diagram of a conventional power converter having a normal operation mode and a standby operation mode according to the prior art.
Figure 2:
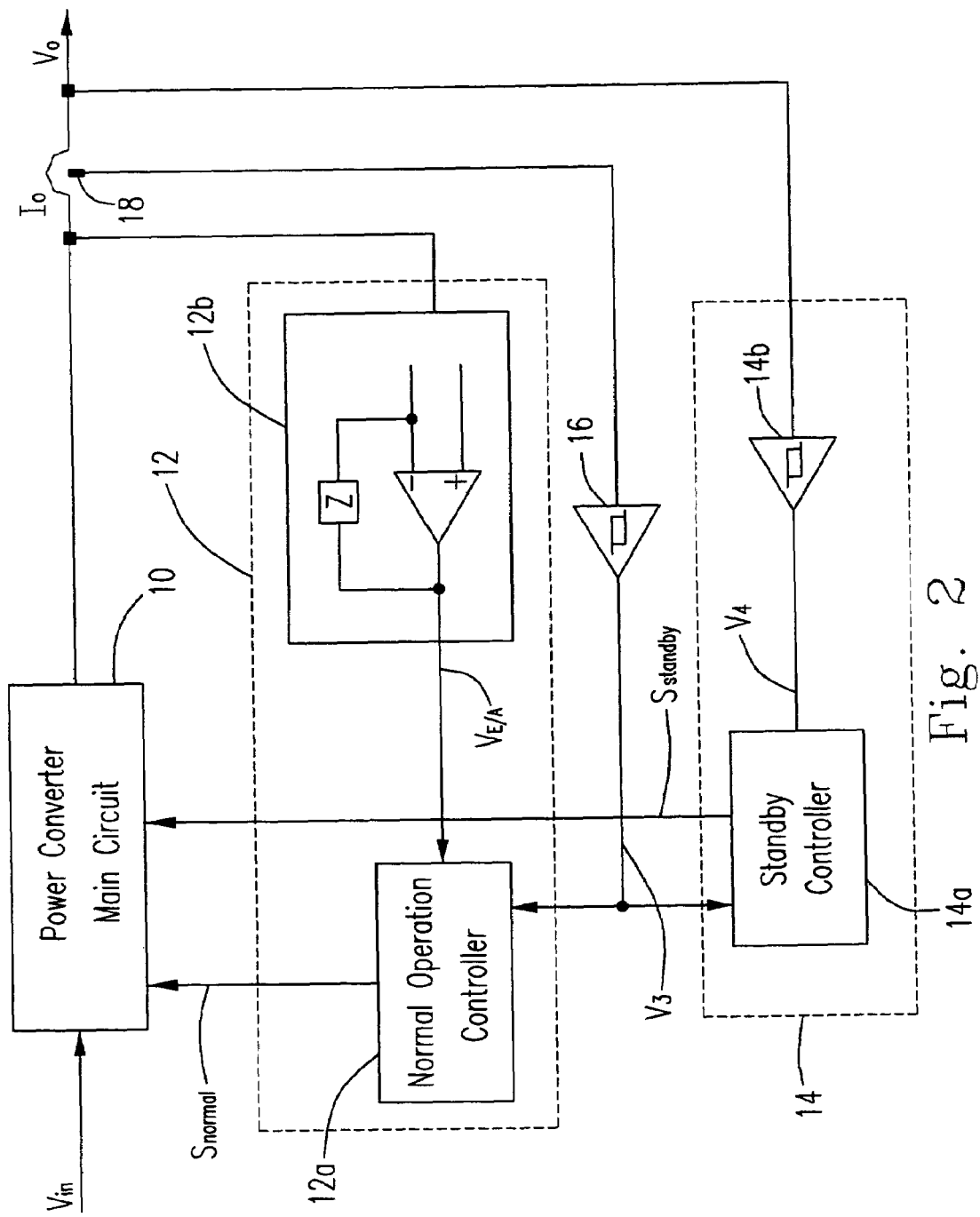
FIG. 2 is a block diagram of a power converter having a voltage hysteretic comparator and a loading hysteretic comparator according to the present invention.

Please refer to FIG. 2. FIG. 2 is a block diagram of a power converter having a voltage hysteretic comparator and a loading hysteretic comparator according to the present invention. The power converter according to the present invention includes a main circuit 10 of a power converter with an input port $V_{in}$ and an output port $V_o$, a main control circuit 12, a standby control circuit 14, a current sensor 18 and a loading hysteretic comparator 16. The main control circuit 12 includes a series arrangement of an error amplifier 12b and a normal operation controller 12a. The error amplifier 12b accepts the voltage Vo of the output port of the main circuit 10 and outputs a $V_{E/A}$ signal which is input to the normal operation controller 12a, whose output $S_{normal}$ is used to control the main circuit 10. The standby control circuit 14 includes a series arrangement of a voltage hysteretic comparator 14b and a standby controller 14a. The voltage hysteretic comparator 14b accepts the voltage Vo of the output port of the main circuit 10 and outputs a V4 signal which is input to the standby controller 14a, whose output $S_{standby}$ is used to control the main circuit 10. The output load current Io is sensed by the current sensor 18 and a load signal is generated. This load signal is input to the loading hysteretic comparator 16. The output of the loading hysteretic comparator 16, V3, is coupled to the normal operation controller 12a and the standby controller 14a.

The operation of the power supply of the present invention will now be described with reference to FIG. 3 and FIG. 4.

Figure 3:
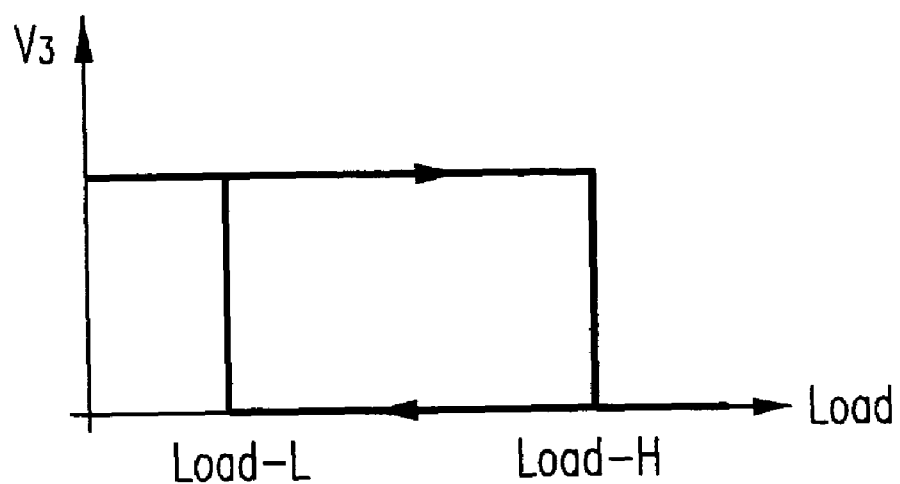
FIG. 3 shows a graph of the loading hysteretic comparator based on the load of FIG. 2.

Referring to FIG. 3, when the load of the output port, sensed by the current sensor 18, decreases from a normal load to a low threshold Load-L of the loading hysteretic comparator 16, the loading hysteretic comparator 16 generates a high level signal V3 and then the high level V3 disables the normal operation controller 12a while enables the standby controller 14a. As a result, the main circuit is controlled by the standby controller 14a. When the load of the output port, sensed by the current sensor 18, increases to a high threshold Load-H of the loading hysteretic comparator 16, the loading hysteretic comparator 16 generates a low level signal V3 and then the signal enables the normal operation controller 12a and disables the standby controller 14a. Then the main circuit is controlled by the main control circuit 12.

In the normal operation mode, the load is high enough and the loading hysteretic comparator 16 will always have a low-level signal V3 output. Thus the standby controller 14a is always disabled while the main control circuit 12, comprising the error amplifier 12b and the normal operation controller 12a, controls the output voltage Vo.

In the standby operation mode, the load is low enough and the loading hysteretic comparator 16 will always have a high level V3 signal output. Thus the normal operation controller 12a is disabled while the standby control circuit 14, including the standby controller 14a and the voltage hysteretic comparator 14b, controls the output voltage Vo.

Moreover, in the standby operation mode, the voltage hysteretic comparator 14b functions as a delta control of the output voltage $V_o$.

Figure 4:
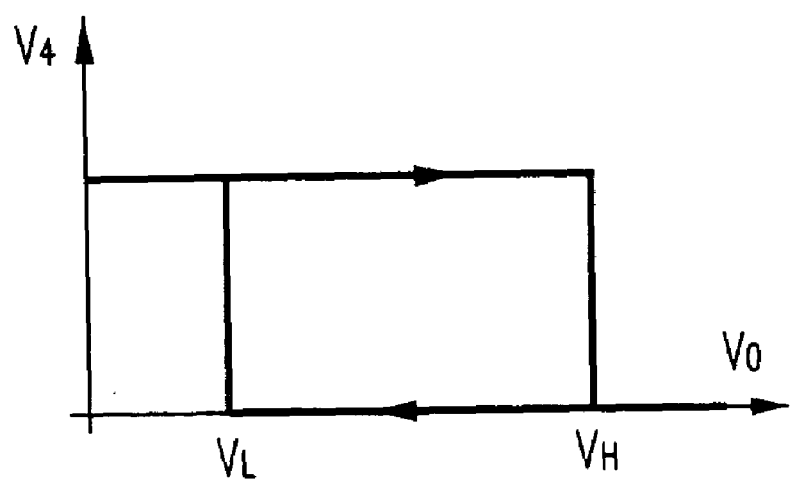
FIG. 4 shows a graph of the voltage hysteretic comparator based on the output voltage of FIG. 2.

Referring to FIG. 4, when the output voltage $V_o$ of the main circuit 10 decreases to a low threshold $V_L$ of the voltage hysteretic comparator 14b. The output of 14b, V4, is a high level signal and then the standby controller 14a produces $S_{standby}$ which has a driving signal for the main circuit, therefore, the output voltage $V_o$ increases. When the output voltage $V_o$ increases to a high threshold $V_H$ of the voltage hysteretic comparator 14b, the V4 signal is at a low level, and then the standby controller 14a produces $S_{standby}$ which has no driving signal for the main circuit, therefore, the output voltage $V_o$ decreases.

The normal operation controller 12a and the standby controller 14a operate independently each with an independent feedback. The error amplifier 12b functions as the feedback loop of the normal operation controller 12a, and the voltage hysteretic comparator 14b functions as the feedback loop of the standby controller 14a.

The loading hysteretic comparator 16 processes a control signal V3 by sensing the load status of the output port to switch the normal operation controller 12a and the standby controller 14a respectively to either of the normal operation mode and the standby operation mode in response to the load status of the output port. In the illustrated embodiment, the loading hysteretic comparator 16, by sensing the load status, selects one controller from the normal operation controller 12a and the standby controller 14a to control the main circuit 10.

In particular, for simple design, a single controller can be used to function as both the normal operation controller 12a and the standby controller 14a.

It is understood that the present invention may be implemented in different power supplies, which will be described in detail hereinafter.

Figure 5:
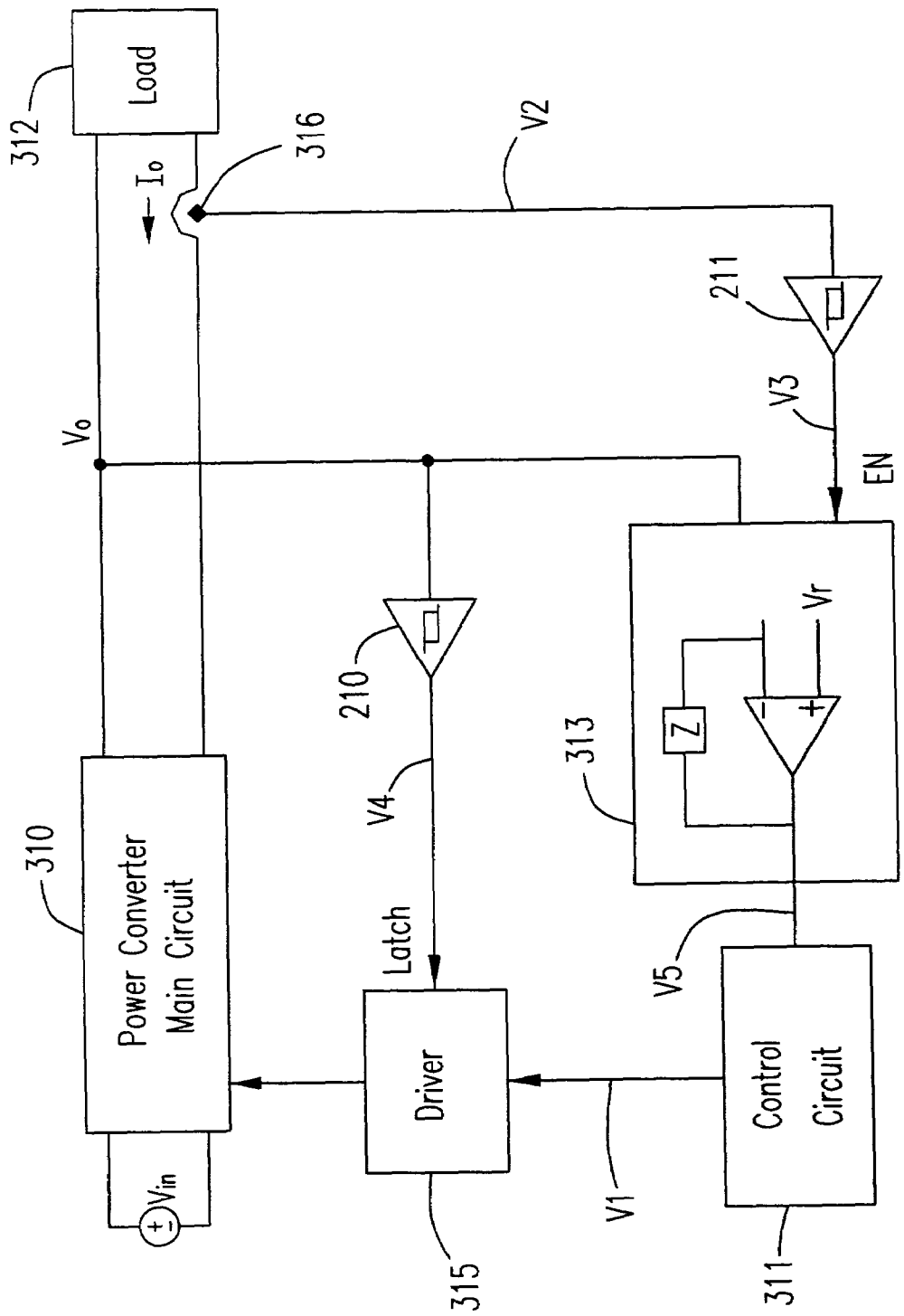
FIG. 5 shows a schematic diagram of a power supply implemented by a switching mode converter according to an embodiment of the present invention.

Please refer to FIG. 5. FIG. 5 shows a diagram of a power supply implemented by a switching mode converter according to an embodiment of the present invention. One DC voltage Vin is applied to the power converter main circuit 310 which outputs a voltage Vo and has a load 312. At normal operation, Vo is input to a feedback loop 313 including an error amplifier. A signal V5, the output of the feedback loop 313, is then coupled to a control circuit 311 to provide a frequency or PWM signal V1 for a driver 315. The driver 315 drives the power converter main circuit 310.

A current sensor 316 generates a signal V2 corresponding to the load status. This signal is then coupled to a loading hysteretic comparator 211 and operated as shown in FIG. 3. In the standby operation mode of this embodiment, the loading hysteretic comparator 211 outputs a high level signal V3 to the feedback loop 313 which then regulates its reference voltage Vr to a higher level compared with that of the normal operation mode. With this means, the output voltage Vo will rise higher than that of the normal operation mode. Based on this higher Vo, a voltage hysteretic comparator 210 is used to control the operation of the main circuit.

In the standby operation mode, because the reference voltage of the feedback loop 313 is regulated higher as aforementioned, the control circuit 311 will generate a corresponding signal V1 and with which the driver 315 drives the power converter main circuit 310. The output voltage Vo will rise higher. Once the Vo is higher than a setting value $V_H$, the voltage hysteretic comparator 210, which functions as shown in FIG. 4, will produce a low level V4 signal and thus the driver 315 is latched. So there is no driving for the power converter main circuit 310 and then Vo decreases.

Once the Vo is decreased to a setting value $V_L$, the voltage hysteretic comparator 210 will produce a high level V4 signal and the driver 315 is unlatched. Thereby, the power converter main circuit 310 is driven by the driver 315 and the output voltage Vo increases. Thus the power converter main circuit 310 operates with burst mode in standby mode.

Herein, the main control circuit is composed of the feedback loop 313, the control circuit 311, and the driver 315 as shown in FIG. 5 for the normal operation mode. While the standby control circuit is composed of the voltage hysteretic comparator 210, the control circuit 311 and the driver 315 as shown in FIG. 2. The corresponding normal operation controller 12a and the standby controller 14a in FIG. 5 are the same as those shown in FIG. 2, including the control circuit 311 and the driver 315, which benefits to the simple and low cost circuit design.

It is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A power supply having a first operation mode and a second operation mode, comprising:

a main circuit having at least one output port for converting an input voltage into an output voltage at said output port;

a first control circuit for controlling said main circuit under said first operation mode;

a second control circuit for controlling said main circuit in a burst mode control when said power supply operates under said second operation mode; and a switching controller processing a control signal to control said first control circuit and said second control circuit to one of said first operation mode and said second operation mode in response to a load status of said output port.

2. The power supply of claim 1, wherein said first control circuit further comprises:
a first controller; and
an error amplifier serially connected between one end of said first controller and said output port.

3. The power supply of claim 1, wherein said second control circuit further comprises:
a second controller; and
a voltage hysteretic comparator serially connected between one end of said second controller and said output port.

4. The power supply of claim 3, wherein said second controller is enabled when said output voltage decreases to a low threshold of said voltage hysteretic comparator and an output voltage of said voltage hysteretic comparator is a first threshold, and said second controller is disabled when said output voltage increases to a high threshold of said voltage hysteretic comparator, and an output voltage of said voltage hysteretic comparator is a second threshold.

5. The power supply of claim 3, wherein said switching controller is a loading hysteretic comparator which senses said load status in which when said load decreases to a low threshold of said loading hysteretic comparator, said loading hysteretic comparator generates a first signal to disable said first controller and enable said second controller, and when said load increases to a high threshold of said loading hysteretic comparator, said loading hysteretic comparator generates a second signal to enable said first controller and disable said second controller.

6. The power supply of claim 1, wherein said first operation mode is a normal operation mode.

7. The power supply of claim 1, wherein said second operation mode is a standby operation mode.

8. The power supply of claim 1, wherein said load status is determined by one of an output current and an output voltage at said output port.

9. A control method for a power supply having a first operation mode and a second operation mode, comprising steps of:
providing a main circuit having at least one output port for converting an input voltage into an output voltage at said output port;
providing a first control circuit for controlling said main circuit under said first operation mode;
providing a second control circuit for controlling said main circuit in a burst mode control when said power supply operates under said second operation mode; and
processing a control signal to control said first control circuit and said second control circuit under one of said first operation mode and said second operation mode in response to a load status of said output port.

10. The control method of claim 9, wherein said control method further comprises steps of:
enabling said second control circuit when said output voltage decreases to a low threshold of a voltage hysteretic comparator, and an output voltage of said voltage hysteretic comparator is a first threshold; and
disabling said second control circuit when said output voltage increases to a high threshold of said voltage hysteretic comparator, and an output voltage of said voltage hysteretic comparator is a second threshold.

11. The control method of claim 9, wherein said control method further comprises steps of:
disabling said first controller and enabling said second controller when said load decreases to a low threshold of a loading hysteretic comparator; and
enabling said first controller and disabling said second controller when said load increases to a high threshold of said loading hysteretic comparator.

12. The control method of claim 9, wherein said load status is determined by an output current at said output port.

13. The control method of claim 9, wherein said load status is determined by an output voltage at said output port.

14. A power supply having a first operation mode and a second operation mode, comprising:
a main circuit having at least one output port for converting an input voltage into an output voltage at said output port;
a voltage control oscillator for providing an operation frequency to operate said main circuit;
a driver for driving said main circuit with said operation frequency;
a controller processing a control signal to control said voltage control oscillator so as to operate said main circuit under one of said first operation mode and said second operation mode in response to a load status of said output port; and
a standby circuit for enabling said driver to control said main circuit in burst mode control when said power supply operates under said second operation mode, wherein when an output voltage of said power supply decreases to a low threshold value, said standby circuit enables said driver and said output voltage increases, and when said output voltage increases to a high threshold value, said standby circuit stops the operation of said driver and said output voltage decreases.

15. A power supply having a first operation mode and a second operation mode, comprising:
a main circuit having at least one output port for converting an input voltage into an output voltage at said output port;
a pulse width modulator for providing a pulse width modulation signal to operate said main circuit;
a driver for driving said main circuit with said pulse width modulation signal;
a controller processing a control signal to control said pulse width modulator so as to operate said main circuit under one of said first operation mode and said second operation mode in response to a load status of said output port; and
a standby circuit for enabling said pulse width modulator to control said main circuit in burst mode control when said power supply operates under said second operation mode,
wherein when an output voltage of said power supply decreases to a low threshold value, said standby circuit enables said driver and said output voltage increases, and when said output voltage increases to a high threshold value, said standby circuit stops the operation of said driver and said output voltage decreases.

* * * * *